US008484169B2

(12) United States Patent
Kitajima et al.

(10) Patent No.: US 8,484,169 B2
(45) Date of Patent: Jul. 9, 2013

(54) CONFIGURATION INFORMATION MANAGEMENT DEVICE, COMPUTER-READABLE STORAGE MEDIUM, AND CONFIGURATION INFORMATION MANAGEMENT METHOD

(75) Inventors: Shinya Kitajima, Kawasaki (JP); Masazumi Matsubara, Kawasaki (JP); Yuji Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/241,456

(22) Filed: Sep. 23, 2011

(65) Prior Publication Data

US 2012/0150821 A1 Jun. 14, 2012

(30) Foreign Application Priority Data

Dec. 13, 2010 (JP) ................................. 2010-277463

(51) Int. Cl.
*G06F 17/00* (2006.01)
(52) U.S. Cl.
USPC ........... 707/690; 707/687; 714/100; 709/220; 709/223
(58) Field of Classification Search
None
See application file for complete search history.

(56) References Cited

U.S. PATENT DOCUMENTS

| | | | |
|---|---|---|---|
| 6,334,158 B1 * | 12/2001 | Jennyc et al. | 719/328 |
| 7,096,439 B2 * | 8/2006 | Tsai et al. | 716/52 |
| 2002/0059556 A1 * | 5/2002 | Brawn et al. | 716/18 |
| 2002/0099787 A1 * | 7/2002 | Bonner et al. | 709/216 |
| 2006/0129940 A1 * | 6/2006 | Rajarajan et al. | 715/738 |
| 2006/0136585 A1 * | 6/2006 | Mayfield et al. | 709/224 |
| 2006/0174132 A1 * | 8/2006 | Owen et al. | 713/182 |
| 2007/0088977 A1 * | 4/2007 | Eguchi et al. | 714/6 |
| 2007/0106695 A1 * | 5/2007 | Miyazawa | 707/104.1 |
| 2007/0288623 A1 * | 12/2007 | Kato et al. | 709/223 |
| 2008/0320022 A1 * | 12/2008 | Owen et al. | 707/101 |
| 2009/0070237 A1 * | 3/2009 | Lew et al. | 705/28 |
| 2009/0319932 A1 * | 12/2009 | Robinson et al. | 715/771 |
| 2011/0153678 A1 | 6/2011 | Matsubara et al. | |

FOREIGN PATENT DOCUMENTS

| | | |
|---|---|---|
| JP | 2004-258733 | 9/2004 |
| WO | WO-2010-073316 | 7/2010 |

* cited by examiner

*Primary Examiner* — Hung Le
(74) *Attorney, Agent, or Firm* — Fujitsu Patent Center

(57) ABSTRACT

When receiving a change of property information that is a key for performing property information integration, a FCMDB refers to the information stored in a property management information DB. Then, when property information that is a key after change is identical with the property information before change in the same configuration item, the FCMDB maintains the property information of the property information DB with respect to the configuration item. On the other hand, when the two property information data are not identical to each other, the FCMDB integrates property information for each configuration item on the basis of the key after change and registers the result in a property information storage unit.

6 Claims, 8 Drawing Sheets

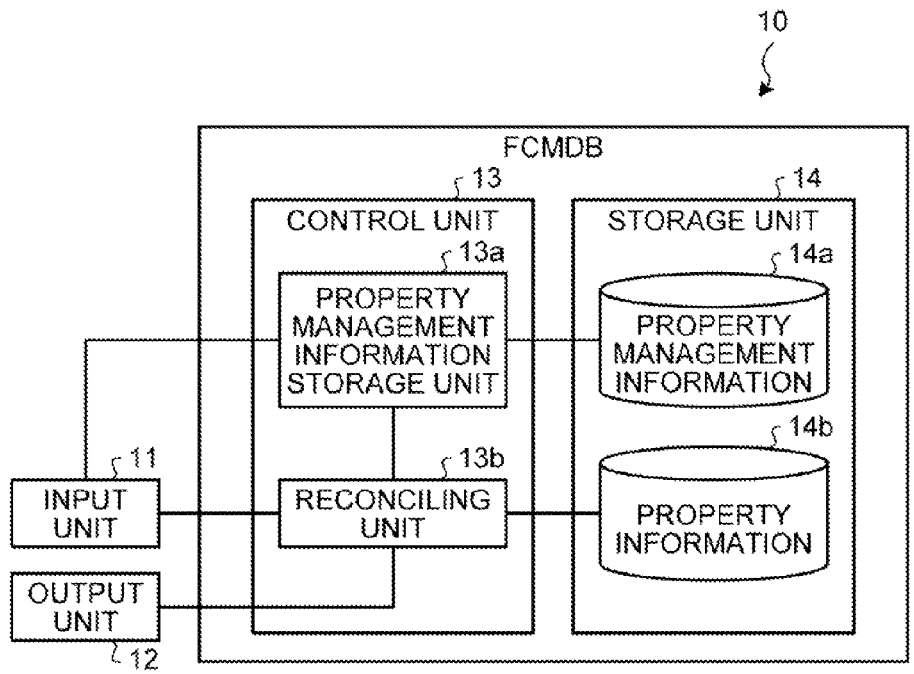

FIG.4

Server1 [CI TYPE:Server] (FCMDB)

| PROPERTY NAME | PROPERTY VALUE |
|---|---|
| Server/@name | svr01 |
| Server/@ipaddr | 192.168.0.2 |
| Server/@macaddr | AA:BB:CC:DD:EE:FF |

Server1 [CI TYPE:Server] (MDR-2)

| PROPERTY NAME | PROPERTY VALUE |
|---|---|
| Server/@name | svr01 |
| Server/company | Fujitsu |
| Server/@macaddr | AA:BB:CC:DD:EE:FF |

Server1 [CI TYPE:Server] (FCMDB)

| PROPERTY NAME | PROPERTY VALUE |
|---|---|
| Server/@name | svr01 |
| Server/@ipaddr | 192.168.0.2 |
| Server/@macaddr | AA:BB:CC:DD:EE:FF |
| Server/company | Fujitsu |

FIG.10
| | ORIGINAL IProp | | ADDED IProp | | | |
|---|---|---|---|---|---|---|
| | NAME | IPADDR | MACADDR | COMPANY | OS | CPU |
| SERVER1 | ○ | × | × | × | × | × |
| SERVER2 | ○ | × | ○ | × | × | × |
| SERVER3 | ○ | ○ | ○ | × | × | × |
| SERVER4 | ○ | × | × | × | × | × |
FIG.11A
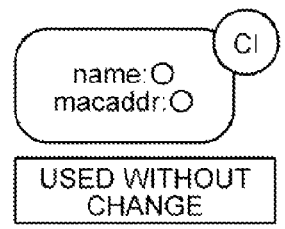
FIG.11B
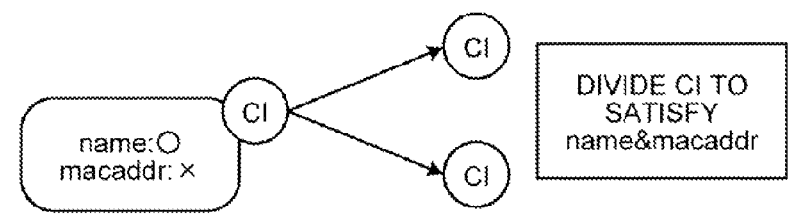

US 8,484,169 B2

CONFIGURATION INFORMATION MANAGEMENT DEVICE, COMPUTER-READABLE STORAGE MEDIUM, AND CONFIGURATION INFORMATION MANAGEMENT METHOD

CROSS-REFERENCE TO RELATED APPLICATION

This application is based upon and claims the benefit of priority of the prior Japanese Patent Application No. 2010-277463, filed on Dec. 13, 2010, the entire contents of which are incorporated herein by reference.

FIELD

The embodiments discussed herein are directed to a configuration information management device, a computer-readable storage medium, and a configuration information management method.

BACKGROUND

There has recently been known a cloud computing technique for managing hardware, software, data, and the like in block in an external data center. For example, a cloud computing technique includes SaaS (Software as a Service), PaaS (Platform as a Service), IaaS (Infrastructure as a Service), and the like.

A company that provides services to users by using the cloud computing technique described above introduces FCMDB (Federated Configuration Management Database) as a technique for managing data for various industries in a data center or the like. The FCMDB is a technique for virtually integrating different type databases to enable a seamless combination of several systems by using CMDB proposed in ITIL (Information Technology Infrastructure Library).

For example, as illustrated in FIG. 15, the FCMDB virtually integrates and manages configuration item information that indicates configuration items (CI) stored in a configuration information management system that manages configuration information and a service management system that manages services. Herein, virtually integrated databases are referred to as MDRs (Management Data Repository).

Each MDR manages, for example, property information on the configuration of devices in an IT system for each configuration type. Furthermore, MDRs have the different configuration type and data amounts of data to be managed and manage various types of information such as property information in association with the local ID of the device itself.

Herein, it will be specifically explained about an integration process that is performed by FCMDB. The FCMDB executes a reconciliation process for receiving the designated IProp (Identifying Property) that is property information corresponding to a name key and integrating information for the same target that is dispersed and managed onto several MDRs on the basis of property information that becomes the designated name key.

The FCMDB may change IProp of CI registered in the FCMDB after the execution of the reconciliation process and again execute the reconciliation process on the CI. In such a case, all data of FCMDB are once deleted and new IProp is set to execute the reconciliation process on the basis of the new IProp. The technique has been known as disclosed in, for example, Japanese Laid-open Patent Publication No. 2004-258733.

However, when IProp is changed and a reconciliation process is again executed, a processing load due to an integration process becomes large because all data of FCMDB are deleted and the integration process is executed on the basis of the new IProp in the method.

SUMMARY

According to an aspect of an embodiment of the invention, a configuration information management device includes a configuration information management device that performs an integration process on property information, the configuration information management device comprising: a storage unit that stores therein, among configuration items, integrated property information obtained by performing a property information integration on a plurality of configuration items that satisfies a first consistency condition on a property and stores therein information that indicates which property has a same property value for all of the plurality of configuration items; and a determining unit that determines, for configuration items that do not satisfy the first consistency condition, whether all properties related to a second consistency condition correspond to a property having the same property value for all of the plurality of configuration items on the basis of the information stored in the storage unit, wherein the determining unit determines that all the properties related to the second consistency condition correspond to the property having the same property value for all of the plurality of configuration items, the integrated property information is used as property information integrated on the plurality of configuration items that satisfies the second consistency condition.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 1 is a block diagram illustrating the configuration of FCMDB according to a first embodiment;

FIG. 2 is a diagram illustrating an example of property management information;

FIG. 3 is a diagram illustrating an example of property information;

FIG. 4 is a diagram explaining a reconciliation process;

FIG. 10 is a diagram illustrating an example of property management information;

FIGS. 11A and 11B are diagrams explaining an addition example of IProp;

DESCRIPTION OF EMBODIMENTS

Figure 5:
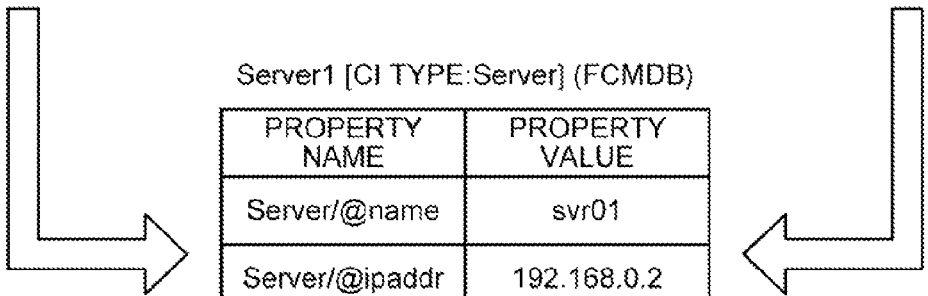
FIG. 5 is a diagram explaining the reconciliation process.

Exemplary embodiments of the present invention will be explained in detail below with reference to the accompanying drawings. The present invention is not limited to the embodiments explained below.

[a] First Embodiment

Hereinafter, it will be sequentially explained about the configuration and process flow of an FCMDB according to the first embodiment. Finally, it will be explained about effects caused by the first embodiment.

Configuration of FCMDB

First, it will be explained about the configuration of the FCMDB (Federated Configuration Management Database) 10 with reference to FIG. 1. FIG. 1 is a block diagram illustrating the configuration of FCMDB according to the first embodiment. As illustrated in FIG. 1, the FCMDB 10 includes a control unit 13 and a storage unit 14 and is connected to an input unit 11 and an output unit 12. The FCMDB 10 is further connected to a client terminal, MDR, and other FCMDB via a network, which are not illustrated. Hereinafter, it will be explained about a process that is performed by each unit.

The input unit 11 is an input device such as a keyboard, a mouse, and a microphone, and is used for inputting a reconciliation instruction, a change instruction of IProp (Identifying Property), and the like. Herein, IProp is used as property information that is a name key. The output unit 12 is, for example, a monitor, a display, a touch panel, a speaker, or the like, and outputs a reconciliation result and the like.

The storage unit 14 stores therein data and programs for various types of processes performed by the control unit 13, and stores property management information 14a and property information 14b. When a process for integrating CIs having the same property value for the designated IProp (property) is performed, the property management information 14a indicates which property has the same property value for all the integrated CIs (for example, property is "1" if all the integrated CIs have the same property value and property is "0" if the CIs do not have the same property value). For example, when an integration process is performed by designating a property 1 as IProp, it is assumed that CIs for which the property value of the property 1 is "A" are integrated as CI1, CIs for which the property value is "B" are integrated as CI2, and CIs for which the property value is "C" are integrated as CI3. In this case, because all the property values of the property 1 of the CIs integrated as the CI1 are "A", all the property values of the property 1 of the CIs integrated as the CI2 are "B", and all the property values of the property 1 of the CIs integrated as the CI3 are "C", "1" is stored for the property 1 of each of CI1 to CI3. Moreover, when all the property values of a property 3 of CIs integrated as CI2 and all the property values of a property 2 of CIs integrated as CI3 have the same value, "1" is similarly stored for the property 3 of CI2 and the property 2 of CI3. When the property values of the integrated CIs are not the same, "0" is stored for other properties. When putting it all together, the property management information 14a indicates "1 (O)" or "0 (X)" every property name for each CI as illustrated in FIG. 2. When CI not having a property value for the corresponding property is integrated, "0" is associated with the property because integrated CIs do not have the same property value.

The property information 14b is property information associated with CI that is a management target. Specifically, the property information 14b can have information as illustrated in FIG. 3 with respect to property values of each CI.

For example, as illustrated in FIG. 3, the property information 14b includes "Server1/@name, svr01" and "Server1/@ipaddr, 192.168.0.2" as "property name and property value" of "Server1" that is CI registered in FCMDB. The property information further includes "Server1/@macaddr, AA:BB:CC:DD:EE:FF" as "property name and property value".

Herein, it will be explained about a reconciliation process that is performed by the FCMDB 10 with reference to FIGS. 4 and 5. FIGS. 4 and 5 are diagrams explaining a reconciliation process. In the examples of FIGS. 4 and 5, an example of an integration process is illustrated by using "name" as IProp that is property information becoming a name key. An example of a process for integrating CI that is already registered in the FCMDB 10 and CI of MDR-2 that is newly registered is illustrated in FIG. 4. An example of a process for integrating CI that is already registered in the FCMDB 10 and CI of MDR-3 that is newly registered is illustrated in FIG. 5.

As illustrated in FIG. 4, the CI already registered in the FCMDB 10 and the CI of "MDR-2" newly registered are integrated by using "name" that is IProp as a key, and the integrated information is stored in the storage unit 14 as the property information 14b. Herein, the CI registered in the FCMDB 10 and the CI of "MDR-2" newly registered have common values of the property value of property name "name" that is IProp and the property value of property name "macaddr". Therefore, the property value of "name" and the property value of "macaddr" are not changed. Moreover, the FCMDB 10 adds a property name "company" and a property value "Fujitsu", which are not in the CI registered in the FCMDB 10 but are in the CI of "MDR-2", to the property information 14b.

As illustrated in FIG. 5, the CI already registered in the FCMDB 10 and the CI of "MDR-3" newly registered are integrated by using "name" that is IProp as a key, and the integrated information is stored in the storage unit 14 as the property information 14b. Herein, the CI registered in the FCMDB 10 and the CI of "MDR-3" newly registered have different property values of property name "macaddr" that are "AA:BB:CC:DD:EE:FF" and "GG:HH:II:JJ:KK:LL". In this case, the FCMDB 10 stores the newly registered property value "GG:HH:II:JJ:KK:LL" of the CI in the property information 14b by overwriting. Moreover, the FCMDB 10 adds and stores a property name "os" and a property value "Windows (registered trademark) Server 2008", which are not in the CI registered in the FCMDB 10 but are in the CI of "MDR-3", to and in the property information 14b.

The control unit 13 has an internal memory that stores therein programs and data for defining various types of processing procedures in order to perform various processes by using them. Moreover, the control unit 13 includes a property management information storage unit 13a and a reconciling unit 13b.

When the integration process is performed, the property management information storage unit 13a compares whether the property information stored in the property information 14b is identical with the property information to be integrated and performs a process for updating the property field of the property management information 14a. Specifically, in the case of the process for updating the property field, the property management information storage unit 13a first acquires one-by-one the property values of the CI already registered in the FCMDB 10 and the property values of the CI to be newly registered at the time of reconciliation during CI registration. Herein, the acquired property value of the CI already registered in the FCMDB 10 and the acquired property value of the CI to be registered are the property values of the same property name.

Then, the property management information storage unit 13*a* determines whether the property field of the property management information 14*a* is "X" for each property name of the acquired property values. As a result, the property management information storage unit 13*a* does not perform the process for updating the property field when the property field of the property management information 14*a* is "X" for each property name of the acquired property values. In other words, the fact that the property field of the property management information 14*a* is "X" in the FCMDB 10 indicates that property values before reconciliation may not be identical to each other or that a property of any target may not exist. For this reason, because the property field is not updated from "X" to "O", the process for updating the property field is not performed not to change the property field of "X" when the property field of the property management information 14*a* is "X".

When the property field is "O", the property management information storage unit 13*a* determines whether the property value of the CI already registered in the property information 14*b* of the FCMDB 10 is identical with the property value of the CI to be newly registered. As a result, when the property value of the CI already registered in the property information 14*b* and the property value of the CI to be newly registered are identical to each other, the property management information storage unit 13*a* sets the corresponding property field in the table of the property management information 14*a* to "O". Moreover, when the property value of the CI already registered in the property information 14*b* and the property value of the CI to be newly registered are not identical to each other, the property management information storage unit 13*a* sets the corresponding property field in the table of the property management information 14*a* to "X".

Next, it will be specifically explained about a process for updating the property field of the property management information 14*a* by using the example illustrated in FIG. 5. Herein, it will be explained about the case where the property values of the property name "Server/@macaddr" are acquired and compared from the CI already registered in the FCMDB 10 and the CI of "MDR-3" newly registered. First, the property management information storage unit 13*a* determines whether the property field of the property management information 14*a* is "X" or not "O" for the property name "Server/@macaddr". As a result, when the property field is "X", the property management information storage unit 13*a* does not perform the process for updating the property field not to change the property field "X" of the property name "Server/@macaddr". Moreover, when the property field is "O", the property management information storage unit 13*a* compares the property value "AA:BB:CC:DD:EE:FF" of the CI already registered in the FCMDB 10 with the property value "GG:HH:II:JJ:KK:LL" of the CI of "MDR-3" newly registered. As a result, the property management information storage unit 13*a* determines that both property values are not identical to each other and sets the corresponding property field in the table of the property management information 14*a* to "X".

Upon receiving the change of IProp that acts as a key for performing an integration of property information, the reconciling unit 13*b* performs the following process with reference to the property management information 14*a*.

Figure 6:
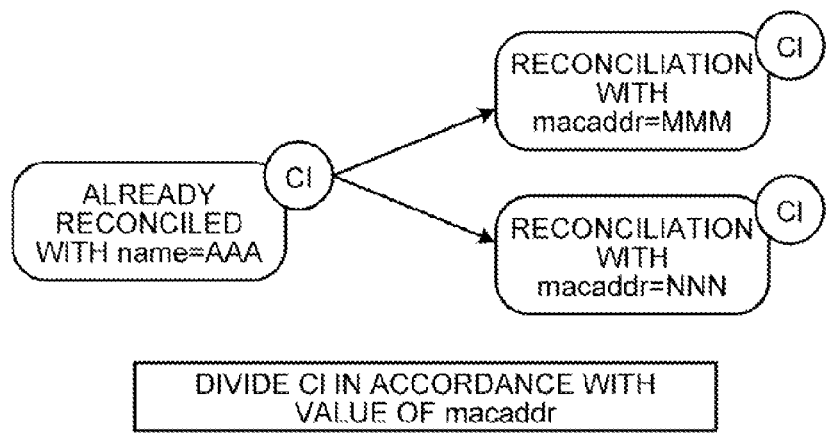
FIG. 6 is a diagram explaining a change example of IProp.
Figure 7:
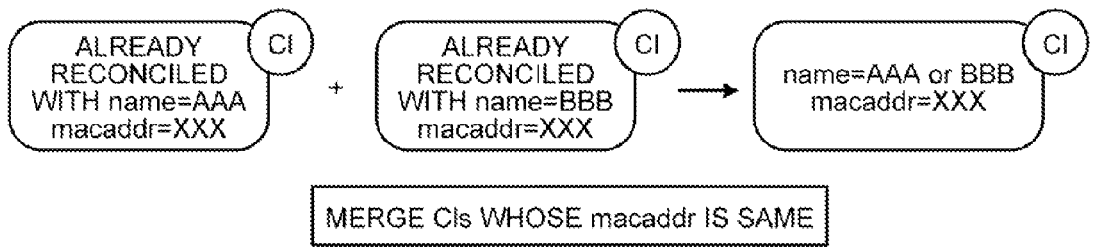
FIG. 7 is a diagram explaining a change example of IProp.

Upon receiving the change of IProp, the reconciling unit 13*b* determines whether it is possible to determine whether the condition of a new IProp is severe in comparison with that of the present IProp. Herein, the fact that it is difficult to determine whether the condition is severe means that IProp is changed as illustrated in FIGS. 6 and 7.

Herein, it will be explained about a reconciliation process when IProp is changed from the property name "name" to the property name "macaddr" with reference to FIGS. 6 and 7. For example, when IProp is changed from the property name "name" to the property name "macaddr", the same CI is divided into different CIs in accordance with the property values of the property name "macaddr" that is the new IProp, as illustrated in FIG. 6. On the other hand, when IProp is changed from the property name "name" to the property name "macaddr", different CIs may be merged into one CI in accordance with the property values of the property name "macaddr" that is the new IProp, as illustrated in FIG. 7. In the case of the integration, for example, "name" is updated to BBB by overwriting. For this reason, when IProp is changed, it is determined that a condition is severe or it is difficult to determine.

When it is determined that it can be determined whether the condition of the new IProp is severe in comparison with that of the present IProp, the reconciling unit 13*b* determines whether the condition of the new IProp is severe in comparison with that of the present IProp. For example, when IProp is added with an AND condition or when an OR condition of IProp is deleted, the reconciling unit 13*b* determines that the condition of the new IProp is severe in comparison with that of the present IProp. On the other hand, when IProp is added with an OR condition or when an AND condition of IProp is deleted, the reconciling unit 13*b* determines that the condition of the new IProp is loose in comparison with that of the present IProp.

Figure 8:
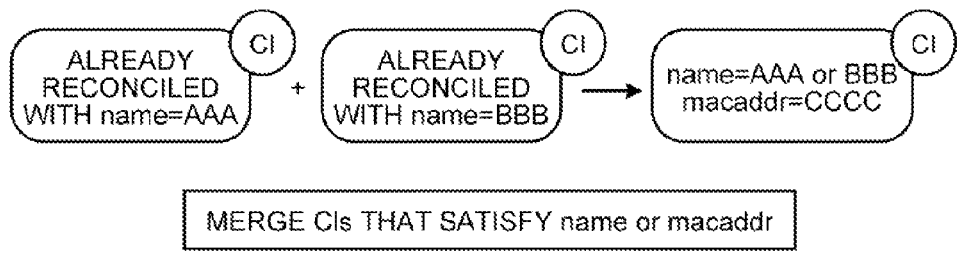
FIG. 8 is a diagram explaining an addition example of IProp.

Herein, it will be explained about the case where the condition of the new IProp becomes loose in comparison with that of the present IProp by using examples of FIGS. 8 and 9. As illustrated in FIG. 8, when IProp is changed from the property name "name" to the property name "name" OR "macaddr", CIs are integrated if property values of any of "name" and "macaddr" are the same. For this reason, as illustrated in FIG. 8, there may be a case where the condition of the new IProp becomes loose in comparison with that of the present IProp and thus different CIs are merged into one CI. In the case of the integration, "name" is updated to BBB by overwriting, for example.

Figure 9:
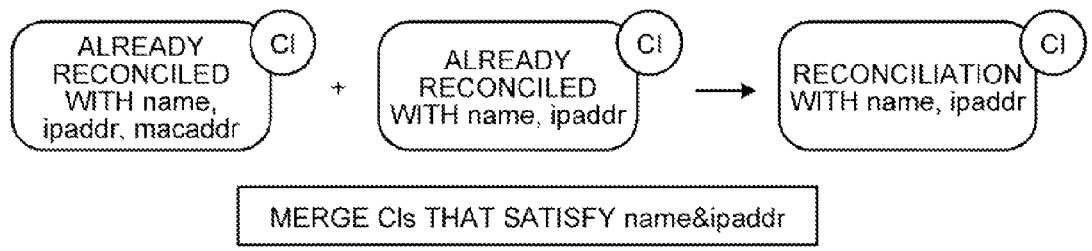
FIG. 9 is a diagram explaining a deletion example of IProp.

As illustrated in FIG. 9, when IProp is changed from the property name "name" & "ipaddr" & "macaddr" to "name" & "ipaddr", an AND condition is deleted and thus the condition became loose. For this reason, as illustrated in FIG. 9, there may be a case where CIs satisfying "name" & "ipaddr" are merged and different CIs are merged into one CI.

After that, when it is determined that the condition of IProp becomes severe, the reconciling unit 13*b* confirms whether all properties corresponding to the new IProp are "O". As a result, when all the properties corresponding to the new IProp is "O", the reconciling unit 13*b* registers the existing CIs stored as the property information 14*b* without change without performing the reconciliation process on the CIs.

Herein, it will be explained about a reconciliation process when IProp is added and the condition of IProp becomes severe as a change example of IProp by using examples of FIGS. 10, 11A, and 11B. FIG. 10 is a diagram illustrating an example of the property management information. FIGS. 11A and 11B are diagrams explaining an addition example of IProp. In the examples of FIGS. 10, 11A, and 11B, it will be explained about the case where CI of which the original IProp is "name" further has "macaddr" as IProp in the FCMDB 10.

When "name" & "macaddr" becomes IProp, the reconciling unit 13b refers to the property management information 14a. When both the property fields of "name" and "macaddr" are "O", the reconciling unit 13b uses the corresponding CIs without change. For example, in the example of FIG. 10, both the property fields of CI "Server2" and CI "Server3" are "O". For this reason, as illustrated in FIG. 11A, the FCMDB 10 uses CI "Server2" and CI "Server3" without change.

When any one of the property fields of "name" and "macaddr" is "X", the reconciling unit 13b performs the reconciliation process in such a manner that IProp satisfies the condition of "name" & "macaddr". For example, in the example of FIG. 10, the property field of the property name "macaddr" of the CI "Server1" is "X". For this reason, as illustrated in FIG. 11B, the reconciling unit 13b performs the reconciliation process to divide the CI in such a manner that IProp satisfies the condition of "name" & "macaddr". In other words, when any one of the property fields of "name" and "macaddr" is "X", the reconciling unit 13b acquires data from each MDR, again performs the integration process by using "name" & "macaddr" that is IProp as a key, and stores the integrated information in the storage unit 14 as the property information 14b.

In this way, the FCMDB 10 refers to the property management information 14a that stores information on whether property values during integration are identical to each other when IProp becoming a key is changed, and registers the CIs without change to reduce the load due to the integration process when all property values corresponding to IProp (property) after change are identical to each other for CIs.

Process by FCMDB

Figure 12:
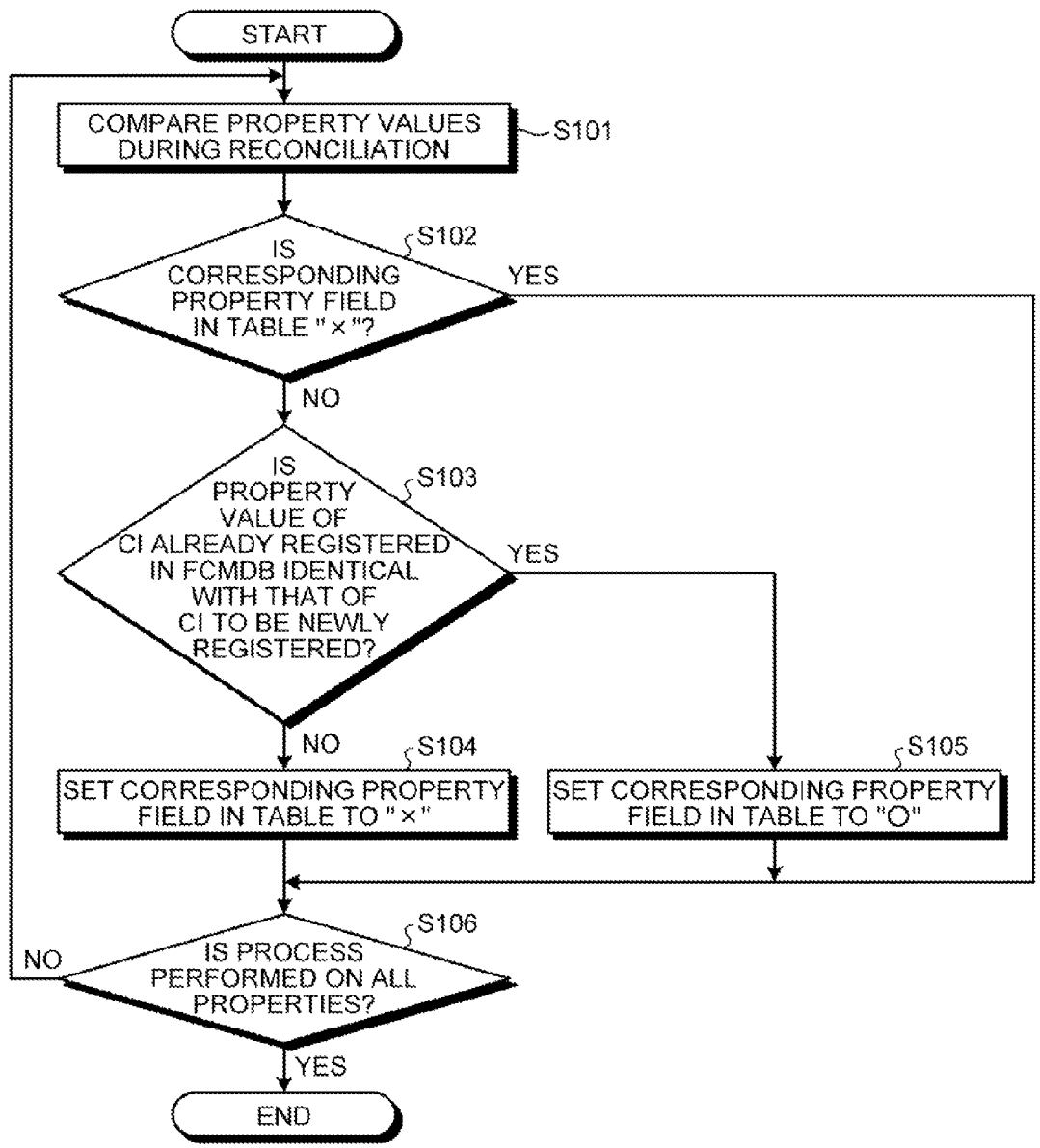
FIG. 12 is a flowchart illustrating table updating process operations that are performed by an FCMDB 10 according to the first embodiment.
Figure 13:
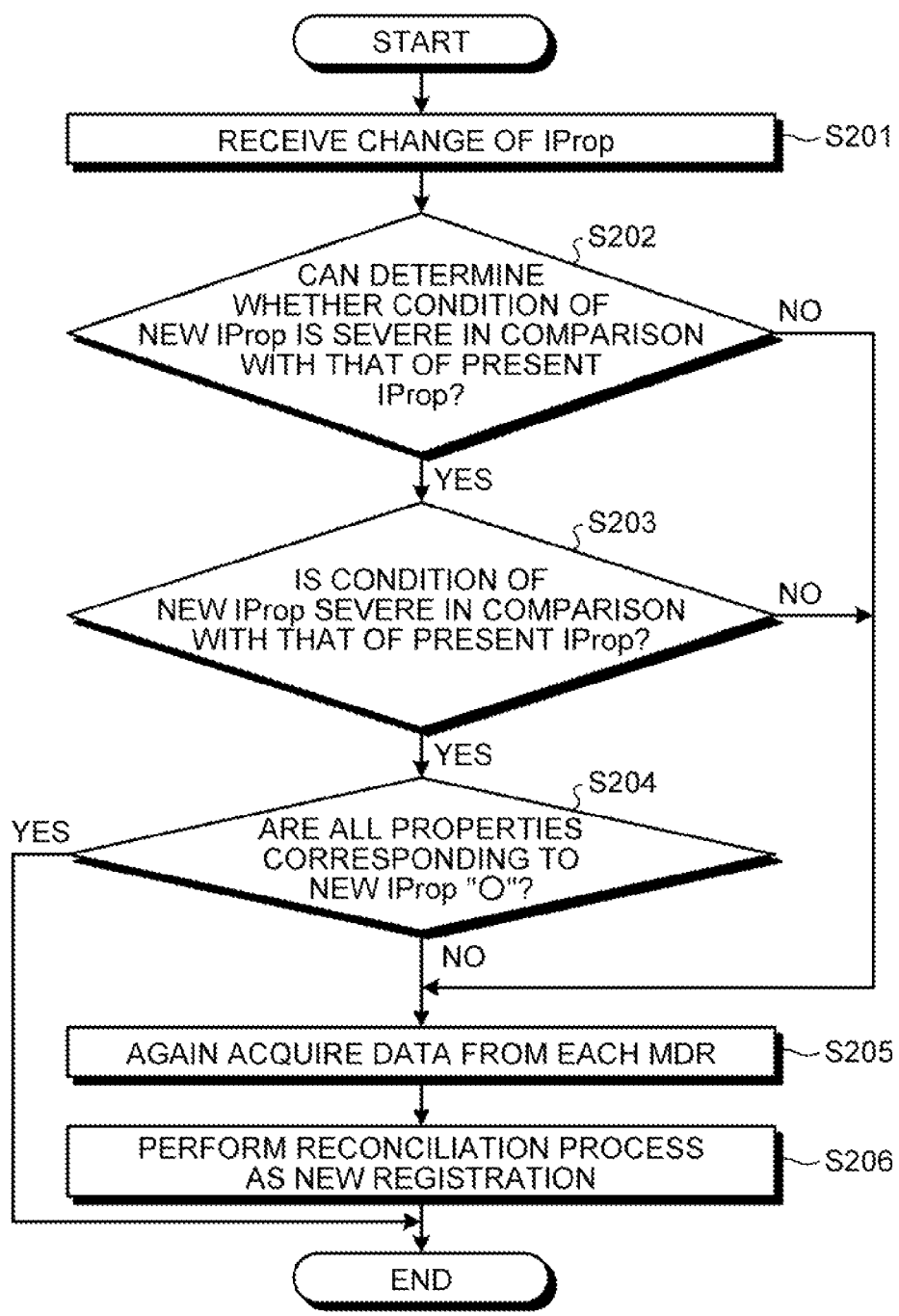
FIG. 13 is a flowchart illustrating reconciliation process operations after the FCMDB 10 receives the change of IProp according to the first embodiment.

Next, it will be explained about a process that is performed by the FCMDB 10 according to the first embodiment with reference to FIGS. 12 and 13. FIG. 12 is a flowchart illustrating table updating process operations that are performed by the FCMDB 10 according to the first embodiment. FIG. 13 is a flowchart illustrating reconciliation process operations after the FCMDB 10 receives the change of IProp according to the first embodiment.

As illustrated in FIG. 12, the FCMDB 10 acquires one-by-one the property values of CIs already registered in the FCMDB 10 and the property values of CIs to be newly registered of which the property value of the designated IProp is the same as that of the already-registered CI (Step S101). Herein, the acquired property values of CIs already registered in the FCMDB 10 and the acquired property values of CIs to be registered are the property values of the same property name.

Then, the FCMDB 10 determines whether the property field stored as the property management information 14a is "X" for the property name of the acquired property values (Step S102). As a result, when the property field stored as the property management information 14a is "X" for the property name of the acquired property values (Step S102: YES), the FCMDB 10 does not perform a process for updating the property field and moves the process control to Step S106. In other words, the fact that the property field stored as the property management information 14a is "X" in the FCMDB 10 indicates that property values before reconciliation may not be identical to each other or that a property of any target may not exist. For this reason, the property field is not updated from "X" to "O".

When the property field is not "X" (Step S102: NO), the FCMDB 10 determines whether the property value of the CI already registered in the property information 14b of the FCMDB 10 is identical with the property value of the CI to be newly registered (Step S103).

As a result, when the property value of the CI already registered in the property information 14b is identical with the property value of the CI to be newly registered (Step S103: YES), the FCMDB 10 sets the corresponding property field in the table of the property management information 14a to "O" (Step S105). On the other hand, when the property value of the CI already registered in the property information 14b is not identical with the property value of the CI to be newly registered (Step S103: NO), the FCMDB 10 sets the corresponding property field in the table of the property management information 14a to "X" (Step S104).

After that, the FCMDB 10 determines whether the table updating process is performed on all the property values (Step S106). When the table updating process is not performed on all the property values (Step S106: NO), the FCMDB 10 returns the process control to Step S101 to repeat the process. On the other hand, when the table updating process is performed on all the property values (Step S106: YES), the FCMDB 10 terminates the process.

Next, it will be explained about reconciliation process operations after the FCMDB 10 receives the change of IProp with reference to FIG. 13. As illustrated in FIG. 13, when receiving the change of IProp (Step S201), the FCMDB 10 determines whether the condition of the new IProp is severe in comparison with that of the present IProp (Step S202). Then, when it is difficult to determine whether the condition of the new IProp is severe in comparison with that of the present IProp (Step S202: NO), the FCMDB 10 again acquires data from each MDR (Step S205) and performs the reconciliation process as a new registration (Step S206).

When it can be determined whether the condition of the new IProp is severe in comparison with that of the present IProp (Step S202: YES), the FCMDB 10 determines whether the condition of the new IProp is severe in comparison with that of the present IProp (Step S203). As a result, when the condition of the new IProp is not severe in comparison with that of the present IProp (Step S203: NO), the FCMDB 10 again acquires data from each MDR (Step S205) and performs the reconciliation process as a new registration (Step S206).

When the condition of the new IProp is severe in comparison with that of the present IProp (Step S203: YES), the FCMDB 10 determines whether all properties corresponding to the new IProp are "O" (Step S204). As a result, when the properties corresponding to the new IProp are not all "O" (Step S204: NO), the FCMDB 10 again acquires data from each MDR (Step S205) and performs the reconciliation process as a new registration (Step S206).

When all the properties corresponding to the new IProp are "O" (Step S204: YES), the FCMDB 10 newly performs reconciliation without a new registration, registers the existing CIs stored in the property information 14b without change, and terminates the process. In other words, upon changing IProp from the property 1 to the property 1 & the property 3 when an integration process is performed by using the property 1 as IProp in FIG. 2, for example, because "1" is associated with both of the properties 1 and 3 for CI2 and the property values of the CI before the integration are identical to each other, it does not have an impact on the property information even if IProp is changed and thus the property information is not updated (it is not necessary to access MDR to perform an integration process).

Effect of First Embodiment

As described above, when a process for integrating CIs having the same property value for the designated IProp is performed, the FCMDB 10 stores, in the storage unit 14, the property management information 14a indicating which property name has the same property value for all the integrated CIs. Then, the FCMDB 10 determines whether all property names related to IProp after change correspond to a property having the same property value for all CIs on the basis of the property management information 14a. As a result, when it is determined that all property names related to IProp after change correspond to a property having the same property value for all CIs, the FCMDB 10 uses the integrated property information 14b as the property information 14b integrated on configuration items that satisfy IProp after change. For this reason, the FCMDB 10 refers to the property management information 14a when IProp is changed. When the property values of each CI are identical for IProp after change, it does not have an impact on the property information 14b even if IProp is changed and thus the property information 14b is not updated. As a result, a processing load due to an integration process can be reduced.

According to the first embodiment, the FCMDB 10 compares IProp before change and IProp after change and determines whether the condition of IProp after change becomes severer than that of IProp before change. As a result, when it is determined that the condition becomes severe and it is determined that all properties on IProp after change corresponded to a property having the same property value for all CIs, the FCMDB 10 uses the integrated property information 14b as the property information 14b integrated on configuration items that satisfy IProp after change. For this reason, an integration process is again performed on IProp of which the integration condition becomes loose and a processing load due to the integration process can be reduced on IProp of which the integration condition becomes severe.

[b] Second Embodiment

It has been explained about the embodiment of the present invention till now. However, the present invention may be realized by various different configurations in addition to the embodiment described above. Therefore, it will be below explained about another embodiment included in the present invention as the second embodiment.

(1) System Configuration

Each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. For example, the property management information storage unit 13a and the reconciling unit 13b may be integrated. Furthermore, all or a part of each process function performed by each device can be realized by CPU and a program that is analyzed and executed by the CPU or can be realized by a hardware by wired logic.

(2) Program

Figure 14:
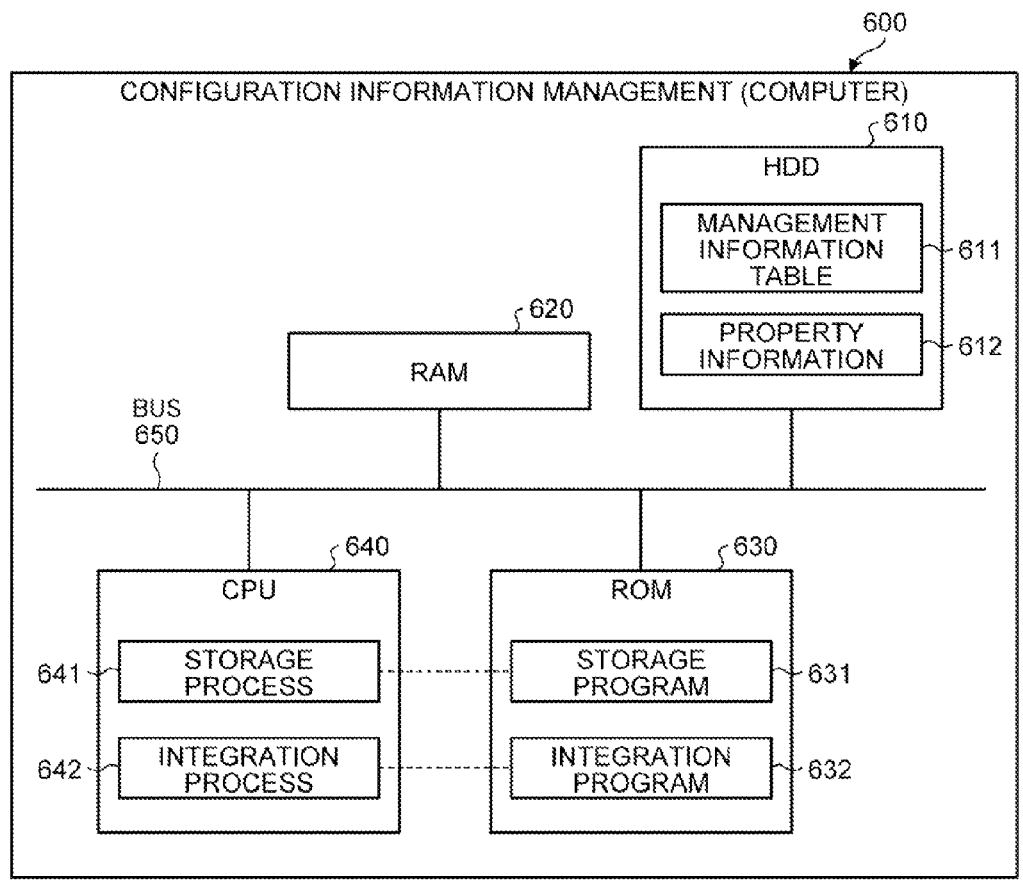
FIG. 14 is a diagram illustrating a computer that executes a configuration information management program.
Figure 15:
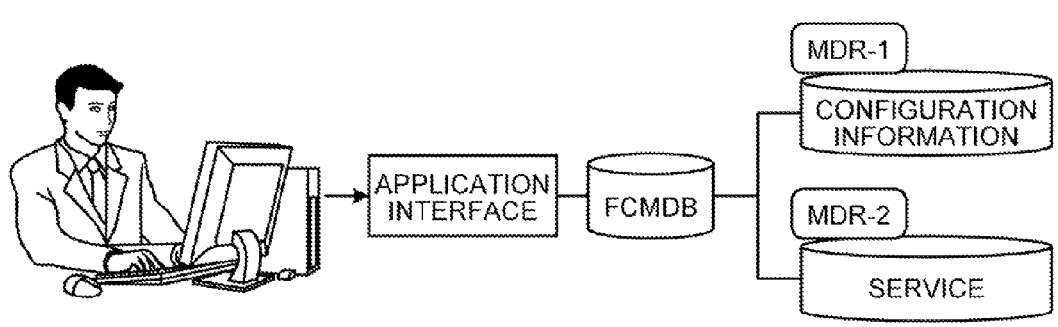
FIG. 15 is a diagram explaining an example of virtually integrating several databases by using FCMDB.

Meanwhile, various types of processes explained in the embodiment can be realized by executing a previously-prepared program by a computer. Therefore, it will be below explained about an example of a computer that executes a program having the same function as that of the embodiment with reference to FIG. 14. FIG. 14 is a diagram illustrating a computer 600 that executes a configuration information management program.

As illustrated in FIG. 14, the computer 600 that acts as the configuration information management program includes an HDD 610, a RAM 620, a ROM 630, and a CPU 640, which are connected to each other by using a bus 650.

The ROM 630 stores therein the configuration information management program that operates the same function as that of the embodiment. In other words, as illustrated in FIG. 14, the ROM 630 previously stores a storage program 631 and an integration program 632. In this case, the programs 631 and 632 may be appropriately integrated or dispersed similarly to configuration items illustrated in FIG. 14.

The CPU 640 reads out the programs 631 and 632 from the ROM 630 and executes the programs. As a result, as illustrated in FIG. 14, the programs 631 and 632 respectively function as a storage process 641 and an integration process 642.

As illustrated in FIG. 14, the HDD 610 stores therein a management information table 611 and property information 612. Then, the CPU 640 registers data in the management information table 611 and reads out the management information table 611 and the property information 612 from the HDD 610 to store these data in the RAM 620, and then executes the processes on the basis of the management information table 611 and the property information 612 stored in the RAM 620.

As described above, according to an aspect of the present invention, a processing load due to an integration process can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A configuration information management device that integrates information on configuration items, the configuration information management device comprising:
   a storage unit that stores therein
      (i) integrated information obtained by integrating a plurality of pieces of information on configuration items that satisfies a first consistency condition, each of the plurality of pieces of information including at least one property and a corresponding property value, and
      (ii) management information that indicates whether each property has a same property value in all of the plurality of pieces of information; and
   a determining unit that determines whether a second consistency condition newly set is severer than the first consistency condition or not, and when the second consistency condition is severer than the first consistency condition, determines whether each property related to the second consistency condition is a property having the same property value in all of the plurality of pieces of information on the basis of the management information stored in the storage unit, wherein
   when the determining unit determines that each property related to the second consistency condition is the property having the same property value in all of the plurality of pieces of information, the integrated information is maintained.

2. The configuration information management device according to claim 1, wherein the determining unit determines that the second consistency condition is severer than the first consistency condition when
(i) the second consistency condition is an AND condition including the first consistency condition and another condition,
(ii) the first consistency condition is an OR condition and the second consistency condition deletes one of the conditions included in the OR condition, and the determining unit determines that the second consistency condition is looser than the first consistency condition when
(iii) the second consistency condition is an OR condition which is the first consistency condition or another condition, and
(iv) the first consistency condition is an AND condition and the second consistency condition deletes one of the conditions included in the AND condition.

3. The configuration information management device according to claim 1, wherein
when the determining unit determines that the second consistency condition is looser than the first consistency condition, the configuration information management device obtains the plurality of pieces of data on the configuration item again, integrates the plurality of pieces of data based on the second consistency condition, and updates the integrated information and the management information based on a result of integration.

4. A non-transitory computer-readable medium storing a configuration information management program that causes a computer to execute:
storing, in a storage unit,
(i) integrated information obtained by integrating a plurality of pieces of information on configuration items that satisfies a first consistency condition, each of the plurality of pieces of information including at least one property and a corresponding property value, and
(ii) management information that indicates whether each property has a same property value in all of the plurality of pieces of information; and
determining whether a second consistency condition newly set is severer than the first consistency condition or not, and when the second consistency condition is severer than the first consistency condition, determining whether each property related to the second consistency condition is a property having the same property value in all of the plurality of pieces of information on the basis of the management information stored in the storage unit, wherein
when it is determined in the determining that each property related to the second consistency condition is the property having the same property value in all of the plurality of pieces of information, the integrated information is maintained.

5. A configuration information management method by which a configuration information management device integrates information on configuration items, the configuration information management method comprising:
storing, in a storage unit,
(i) integrated information obtained by integrating a plurality of pieces of information on configuration items that satisfies a first consistency condition, each of the plurality of pieces of information including at least one property and a corresponding property value, and
(ii) management information that indicates whether each property has a same property value in all of the plurality of pieces of information; and
determining whether a second consistency condition newly set is severer than the first consistency condition or not, and when the second consistency condition is severer than the first consistency condition, determining whether each property related to the second consistency condition is a property having the same property value in all of the plurality of pieces of information on the basis of the management information stored in the storage unit, wherein
when it is determined in the determining that each property related to the second consistency condition is the property having the same property value in all of the plurality of pieces of information, the integrated information is maintained.

6. A configuration information management device that performs an integration process on property information, the configuration information management device comprising:
a processor; and
a memory that stores therein
(i) integrated information obtained by integrating a plurality of pieces of information on configuration items that satisfies a first consistency condition, each of the plurality of pieces of information including at least one property and a corresponding property value, and
(ii) management information that indicates whether each property has a same property value in all of the plurality of pieces of information, wherein the processor executes:
determining whether a second consistency condition newly set is severer than the first consistency condition or not, and when the second consistency condition is severer than the first consistency condition, determining whether each property related to the second consistency condition is a property having the same property value in all of the plurality of pieces of information on the basis of the management information stored in the memory, wherein
when it is determined that each property all related to the second consistency condition is the property having the same property value in all of the plurality of pieces of information, the integrated information is maintained.

* * * * *